US008157904B2

(12) United States Patent
Ammermann et al.

(10) Patent No.: US 8,157,904 B2
(45) Date of Patent: Apr. 17, 2012

(54) ACTIVATED CARBON FILTER UNIT FOR A TANK SYSTEM

(75) Inventors: Stephan Ammermann, Gottingen (DE); Heiko Freter, Einbeck (DE)

(73) Assignee: A. Kayser Automotive Systems GmbH, Einbeck (DE)

( * ) Notice: Subject to any disclaimer, the term of this patent is extended or adjusted under 35 U.S.C. 154(b) by 230 days.

(21) Appl. No.: 12/430,938

(22) Filed: Apr. 28, 2009

(65) Prior Publication Data

US 2009/0293726 A1 Dec. 3, 2009

Related U.S. Application Data

(60) Provisional application No. 61/056,960, filed on May 29, 2008.

(51) Int. Cl.
*B01D 53/04* (2006.01)

(52) U.S. Cl. .................... 96/113; 96/421; 95/15; 95/19; 95/146; 123/518; 123/519; 123/520

(58) Field of Classification Search ................ 95/15, 19, 95/146; 96/113, 421; 123/518–521
See application file for complete search history.

(56) References Cited

U.S. PATENT DOCUMENTS

| | | | | |
|---|---|---|---|---|
| 5,193,512 | A * | 3/1993 | Steinbrenner et al. | 123/520 |
| 5,207,808 | A * | 5/1993 | Haruta et al. | 96/131 |
| 5,220,799 | A * | 6/1993 | Lievens et al. | 62/48.2 |
| 5,238,470 | A * | 8/1993 | Tolles et al. | 95/143 |
| 5,324,703 | A * | 6/1994 | McCue et al. | 502/424 |
| 5,337,721 | A * | 8/1994 | Kasuya et al. | 123/519 |
| 5,377,644 | A * | 1/1995 | Krohm | 123/520 |
| 5,393,329 | A * | 2/1995 | Inagaki et al. | 96/131 |
| 5,408,976 | A * | 4/1995 | Reddy | 123/519 |
| 6,279,548 | B1 * | 8/2001 | Reddy | 123/520 |
| 6,390,073 | B1 * | 5/2002 | Meiller et al. | 123/519 |
| 6,478,849 | B1 * | 11/2002 | Taylor et al. | 95/11 |
| 6,540,815 | B1 * | 4/2003 | Hiltzik et al. | 95/146 |
| 6,579,507 | B2 * | 6/2003 | Pahlman et al. | 423/210 |
| 7,021,296 | B2 * | 4/2006 | Reddy | 123/520 |
| 2002/0157655 | A1 * | 10/2002 | Streib | 123/520 |

* cited by examiner

*Primary Examiner* — Duane Smith
*Assistant Examiner* — Christopher P Jones
(74) *Attorney, Agent, or Firm* — Fox Rothschild

(57) ABSTRACT

An active carbon filter unit for a tank system consists of a housing (13) in which two chambers (31, 32) are formed, carrying an active carbon filling, which form a section of a flow path which at its one end leads via a valve (6) and an air filter (7) into the ambient atmosphere and at its other end leads via a valve (9) and a non-return valve (10) to a connection for producing an underpressure or into the suction region of an internal combustion engine and via a connection (17) into the tank system. The valves (6, 9), the non-return valve (10) and a housing part (27) receiving the electrical connections thereof are part of a uniform control module (15), which is exchangeably inserted into a recess (14) of the housing (13). The control module (15) is equipped with almost all functional elements of a technical nature relating to measurement, control and energy supply which are necessary for an aeration and air removal operation, a flushing operation directed to a regeneration of the active carbon, and a tightness check of the tank system.

18 Claims, 8 Drawing Sheets

ACTIVATED CARBON FILTER UNIT FOR A TANK SYSTEM

BACKGROUND

The invention relates to an active carbon filter unit for a tank system.

For reasons of environmental protection, an escape of hydrocarbon components must be restricted from the fuel container of a tank system which is connected with the ambient atmosphere to balance out different filling levels, temperature fluctuations, evaporations etc. Legal requirements also stipulate a tightness check of the tank system which is to be carried out in an automated manner.

From the document U.S. Pat. No. 6,390,073 B1 a tank system of a motor vehicle is known with an active carbon filter unit which consists of a housing, forming internally two chambers intended to receive active carbon, which are connected with each other via a gap, wherein one chamber is provided with connections for those ducts which are connected with the head space of a fuel container and those which are connected with a suction region of an internal combustion engine. The other chamber, at its end facing away from the gap and with the intermediate arrangement of a first electrically actuatable valve and of a filter, is provided with an air-removal duct leading into the free atmosphere. This first valve is designed as a structural unit which is able to be inserted into a cylindrical recess of the housing and is constructed such that it opens in the idle state and closes when live. It is additionally designed with the requirement that the opening process, which is initiated by a spring, is assisted by the vacuum of the said suction region. A second electrically actuatable valve is situated in the duct which connects the first chamber with the suction region.

During refueling when the engine is not running, the first vale is in the open position, so that air enriched with hydrocarbons can be displaced out of the head space of the fuel container and can escape into the atmosphere via the chambers, containing active carbon, and the filter, with a hydrocarbon component being retained adsorptively. When the engine is running, vice versa the air is drawn in via the filter and the open first valve, wherein in the region of the chambers hydrocarbon components which are still bonded are entrained as a result of desorption and are introduced via the open second valve into the combustion chamber of the engine.

Through the fact that firstly the first and subsequently the second valve are transferred into a closed position, so that the tank system, when the engine is running, is temporarily entirely exposed to the effect of the engine vacuum, a defined underpressure is developed within the tank system, so that the course of the reduction of a differential pressure to the ambient atmosphere provides indications for any unacceptable leakages which may be present.

A feature of this known active carbon filter unit is that to constitute the different forms of operation of aeration and air removal, of flushing and of a tightness check within the tank system a cooperation of structural elements, to be mounted individually, is also necessary outside the active carbon filter unit. In individual cases, this can entail a great effort with regard to installation and in the tightness check, which is ultimately based on a comparison with a standard pressure distribution, it can make costly adjustment operations necessary which are adapted individually to the installation situation. A function check of the cooperating components of the tank system during the air removal operation or a flushing operation and a tightness check can also prove to be comparatively laborious.

SUMMARY OF THE INVENTION

With this background, the object of the invention is to develop an active carbon unit of the type described in the introduction with regard to a simplified manageability concerning installation, in particular with regard to a simpler structure of the tank system. This problem is solved in such an active carbon filter unit for a tank system consisting of a housing, having at least one chamber fillable with active carbon. The filter unit has a flow path through the chamber which includes the active carbon and which is capable of being brought in connection for fluid communication with the tank system, ambient atmosphere and an underpressure according to the execution of an operation for air removal, aeration or flushing or of a tightness check. A control module is insertable into a recess of the housing, and which module includes a first valve positioned in the flow path for opening and closing the connection of the flow path with the ambient atmosphere and a second valve positioned in the flow path for opening and closing the communication to the connection for producing the underpressure.

Accordingly, the concept of a control module, hence of a structural element which is, moreover, separable from the housing of the active carbon unit conceptually and concretely, into which at least the valves constituting or separating the connections to the ambient atmosphere and to the suction region of the internal combustion engine are structurally integrated, is essential to the invention. For the construction of the tank system, the installation of valves is dispensed with in the course of ducts through which these connections are constituted. This brings about a simplification on installation, but in particular the advantage that the functionality of valves and sensors is able to be checked outside the active carbon filter. Furthermore, a structural unit consisting of the housing with inserted control module, can also be checked before installation into a vehicle. In each case, the control module is in operative connection with the housing and can be exchanged easily in the case of breakdown. The type of connection can consist of an aggregation with regard to components however, the connection can be of a merely functional nature.

The control module can be insertable into a recess of the housing and in this inserted state can be secured reliably in a suitable manner. It can also be in detachable connection with the housing in another manner. For example, a separate housing which is in detachable connection with the housing of the active carbon filter unit can be provided for the control module.

Other features of the control module concern functions of the tank system directed to control or measurement or respective monitoring. In this context, it is essential that these are integrated in an exchangeably arranged structural group. In detail, this can be a non-return valve here, the use of which is known as such, namely to absorb pressure peaks of the combustion chamber of the engine. It may further concern sensors for picking up pressure and temperature of the gas atmosphere of the tank system, hence as a whole all the structural groups or structural elements inhibiting or releasing the gas flow within the tank system and detecting its data, in particular of a thermal nature. These are therefore combined in the control module, so that the structure of the housing is, moreover, comparatively simple.

In further embodiments, an air filter can be included in the control module or be an integral component of the housing.

In another feature of the invention, a housing part is situated on the control module, which forms an interface for electrical leads concerning measurement, control and energy supply, with a plug connection being able to be provided here, for example. This uniform electrical connection site offers, at the same time, possibilities for a standardized fault check in the dismantled state of the control module.

Still more features of the invention are directed to the development of the control module, in so far as its suitability is concerned for carrying out a tightness check of the tank system, running in an automated manner. For this purpose, a measurement chamber is arranged, the gas atmosphere of which, moreover, corresponds to that of the tank system and which is in operative connection with the said sensors. To carry out a tightness check, which is based on the temporary constitution of a partial vacuum by means of the suction region of the internal combustion engine and the evaluation of its chronological sequence, a superordinate control containing a computer system is necessary, which triggers the process of the tightness check and, by means of comparative data, makes possible a statement concerning the result of the tightness check.

The features of other embodiments are directed to further developments of the control module or of the housing. For example, the at least one chamber of the housing, holding an active carbon filling, forms a section of the flow path during the aeration and air removal of the tank system and also during the tightness check.

As discussed above, it can be seen that by the active carbon unit according to the invention a structural element is made available which is distinguished by a higher degree of aggregation of functional elements of a tank system compared with the prior art. In particular, due to the exchangeability of the control module, advantages are produced of a technical nature concerning installation, and also in the diagnosis of faults, because a checking of all functions of the control module can be carried out in the dismantled state.

Furthermore, the advantage is produced of a housing, moreover, which is provided very simply, so that it is possible to be able to use the control module in different housings, which only have to be equipped with means for fastening or holding and with interfaces of a flow path for the integration of a chamber containing active carbon.

BRIEF DESCRIPTION OF THE DRAWINGS

The invention will be described in further detail below with reference to the example embodiment illustrated in the drawings, in which.

DETAILED DESCRIPTION OF THE INVENTION

Figure 1:
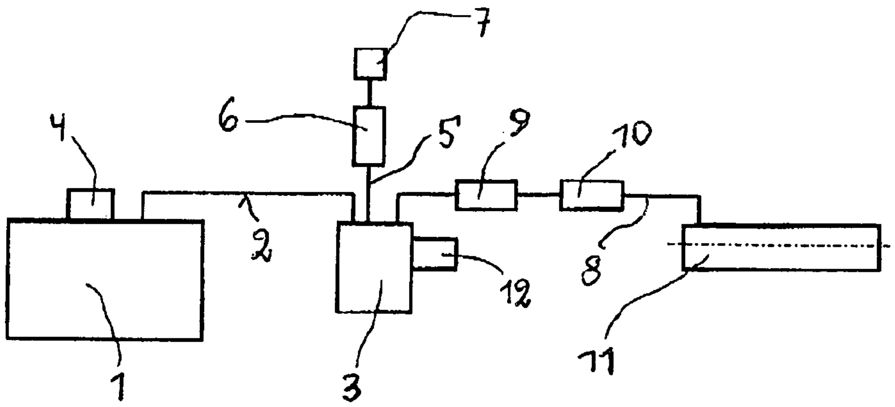
FIG. 1 shows a circuit diagram of a tank system of a motor vehicle, including an active carbon filter unit.

In FIG. 1 the fuel container of a tank system is designated by 1, the head space of which is connected via a ventilation duct 2 with an active carbon unit 3. A sensor detecting the temperature of the gas atmosphere of the tank system is designated by 4, the function of which will be described in further detail below. Practically, the ventilation duct can also be arranged at a different location of the tank system or of a tank duct.

A further air duct 5, connected to the active carbon unit, leads into the free atmosphere via a valve 6 and an air filter 7. The active carbon unit 3 connects with the suction pipe 11 via another air duct 8, in the course of which a valve 9 and a non-return valve 10 are arranged following one another in the direction of the suction pipe 11 of an internal combustion engine which is not illustrated in the drawing.

A sensor, connected with the active carbon filter unit, intended to detect a differential pressure between the tank system and the surrounding atmosphere, is designated by 12, the function of which will likewise be described in further detail below.

Figure 2:
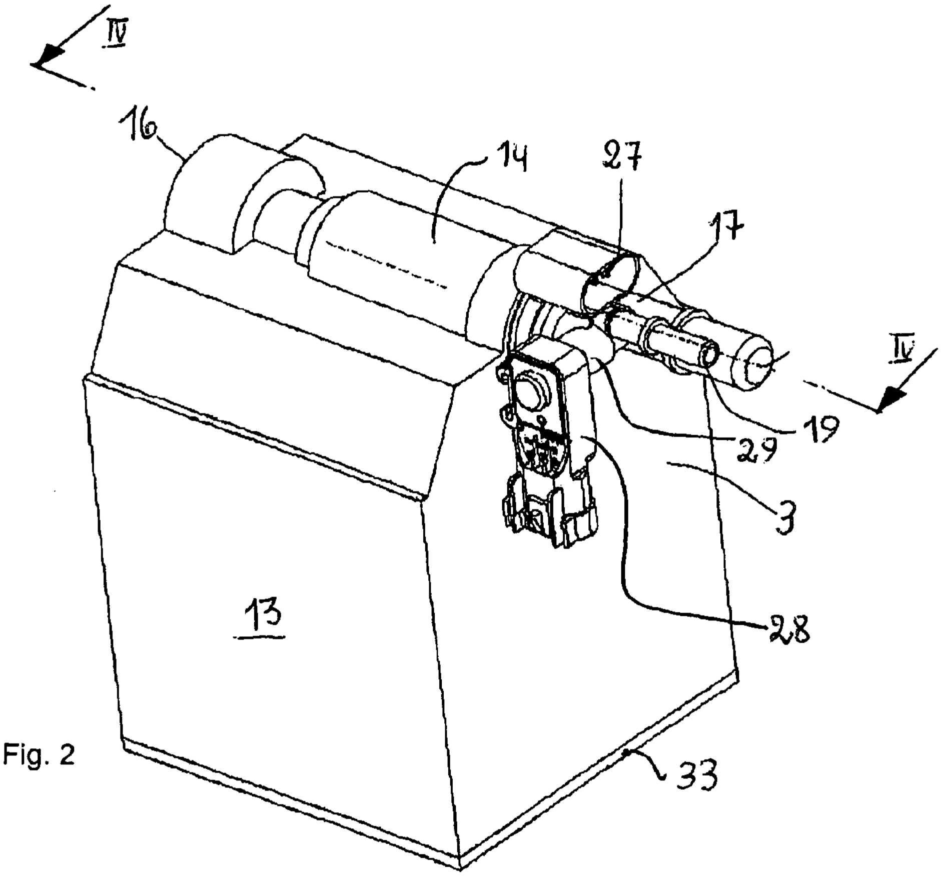
FIG. 2 shows a perspective illustration of an active carbon filter unit according to the invention.
Figure 3:
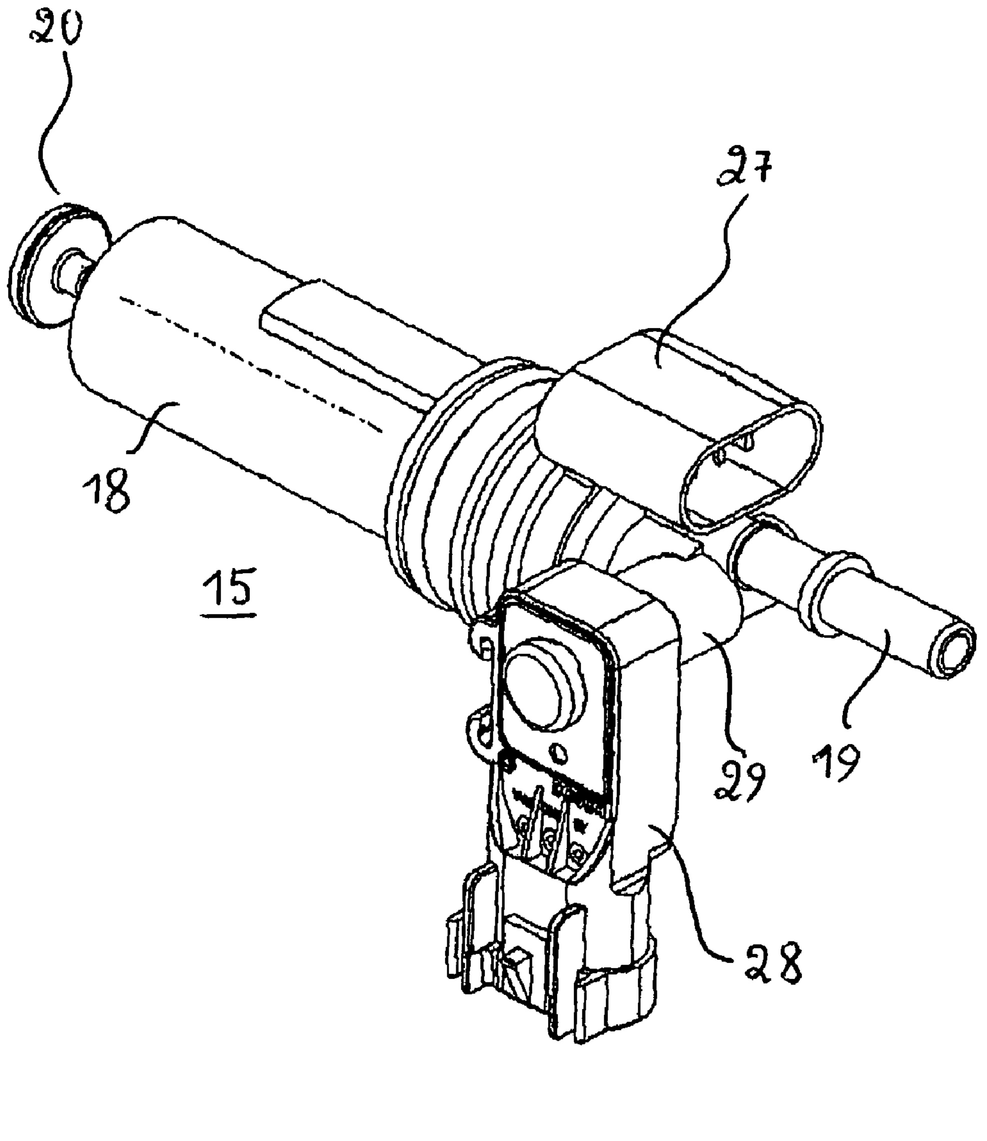
FIG. 3 shows a perspective illustration of the control module of the active carbon filter unit according to FIG. 2.
Figure 5:
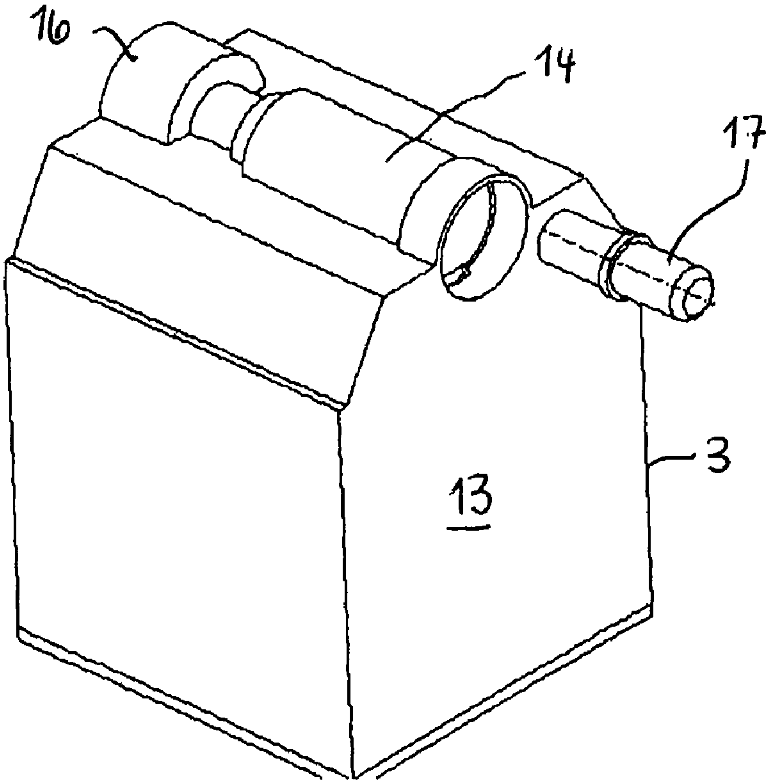
FIG. 5 shows a perspective illustration of the active carbon filter unit, in which the control module has been removed.

As can be seen with the aid of FIGS. 2, 3 and 5, the active carbon filter unit 3 consists of a housing 13, in the upper region of which a mounting 14 is formed for a control module 15, which is insertable detachably into this recess 14 and is fixed in the inserted position in a suitable manner which is not illustrated in the drawing. The housing 13 is provided with connections 16 for the air duct 5 and 17 for the duct 2.

Figure 4:
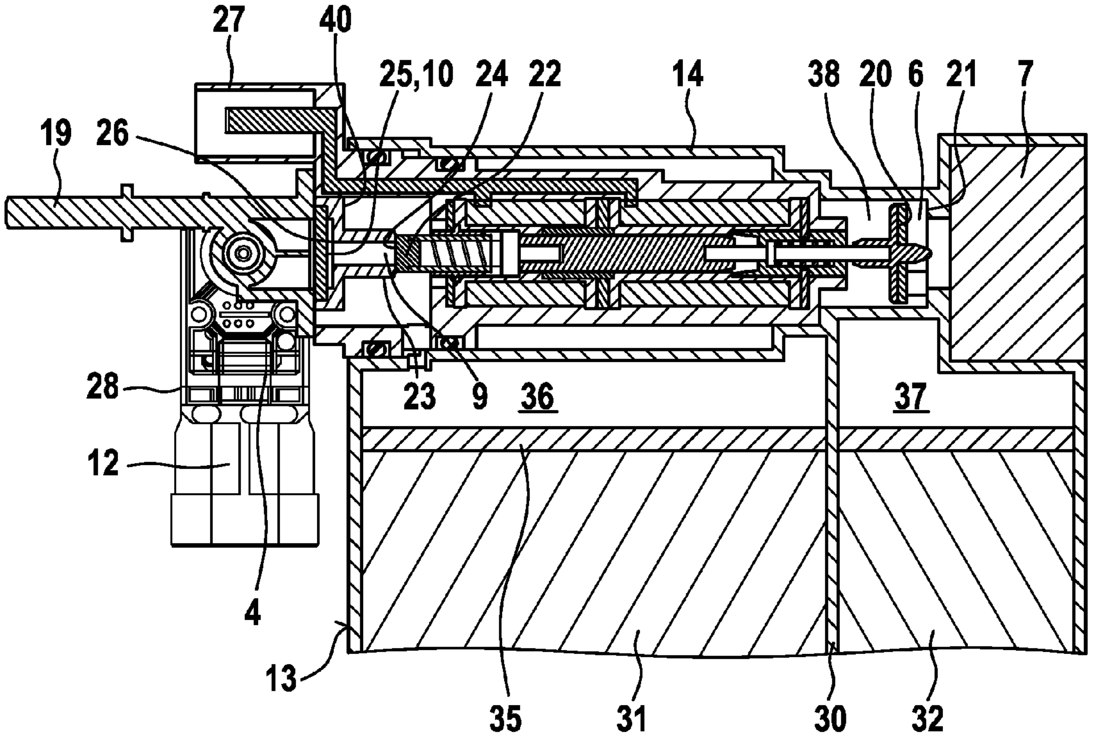
FIG. 4 shows an enlarged partially sectional illustration of the active carbon filter unit with inserted control module according to a sectional plane IV-IV of FIG. 2.

The control module 15 consists of an elongated, globally cylindrical base body 18, at one end of which a connection 19 is situated for the duct 8, with reference being made, moreover, to FIG. 4 to describe its configuration.

According to the invention, the valve 6 is integrated into the control module 15 and is characterized by a valve plate 20 which is to be actuated electromagnetically and is movable in the axial direction of the base body 18, which valve plate 20 is arranged in the input region of the air filter 7, for cooperation with a valve seat surface 21 in the form of a circular ring.

According to the invention, the valve 9 is integrated into the control module 15 and is characterized by a valve plate 22, to be actuated electromagnetically and likewise movable in the axial direction of the base body 18, which is arranged for cooperation with a valve seat surface 24 formed by an end face of a tube element 23.

According to the invention, finally, the non-return valve 10 is integrated into the control module 15 and is characterized by a valve plate 25, likewise movable in the axial direction of the base body, which is arranged for cooperation with a valve seat surface 26 formed by the other end face of the tube element 23 and in the illustration in the drawing according to FIG. 4 in the direction on the right side lies under spring pre-stressing against the said valve seat surface.

A housing part formed on the base body 18, integrating at least the electrical connections of the valves 6, 9, is designated by 27.

In this respect, it is essential that the control module 15 is a component which is able to be inserted independently detachably into the recess 14 of the housing 13, and is therefore arranged so as to be exchangeable and in particular able to be produced independently of the housing. This unites several structural elements which are required for the operation of the tank system, including the control, measurement and monitoring functions associated therewith.

A housing part which is likewise arranged on the base body 18 with intermediate arrangement of a cylindrical section 29 is designated by 28, in which the sensors 4, 12 are held. Connections for measurement and/or energy supply lines of these sensors can likewise be held in the housing part 27.

Figure 6:
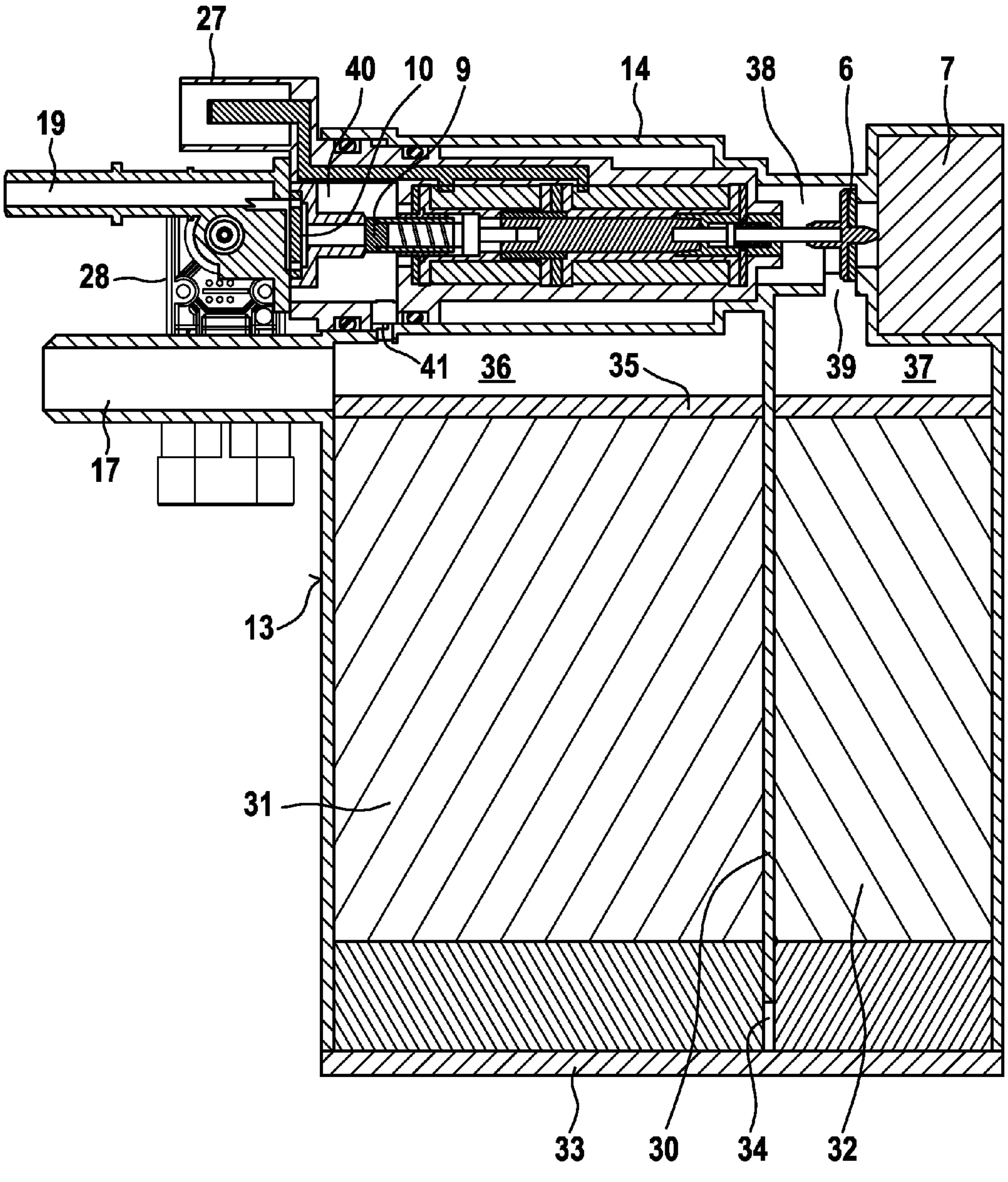
FIG. 6 shows an illustration of the active carbon filter unit with inserted control module in a vertical sectional plane.

As can be seen by means of FIGS. 4 and 6, the housing 13 is divided by an intermediate wall 30 into two chambers 31, 32 which are filled with active carbon and which in the region of the base 33 of the housing are connected with each other via an opening 34 or opening arrangement making possible a passage of air. Inside the housing 13, also delimited on the upper side by the facing wall of the recess 14, a chamber is arranged, delimited on the underside by an intermediate base 35, which is divided into two chambers 36, 37 by the intermediate wall 30.

On the side of the air filter 7, delimited substantially by the walls of the recess 14 and those of the control module 15, a chamber 38 is arranged, which is in continuous connection with the chamber 37 via an opening 39 and which, moreover, is connected with the ambient atmosphere via the air filter 7, according to the position of the valve 6.

On the side of the housing part 27, inside the control module 15 a chamber 40 is arranged, in continuous connection with the chamber 36 via openings 41, communicating with each other, of the base body 18 of the control module and of the walls of the recess 14. The chamber 40, moreover, is in continuous communication with the connection 17, according to the position of the valve 9 and of the non-return valve 10. A constant connection exists between the chamber 36 and the connection 17, which is intended for the connection with the head space of the fuel container 1 (FIG. 1).

Openings in the intermediate base 35, via which continuous connections are arranged between the chambers 32, 27 and 31,36, are not illustrated in the drawing.

Figure 9:
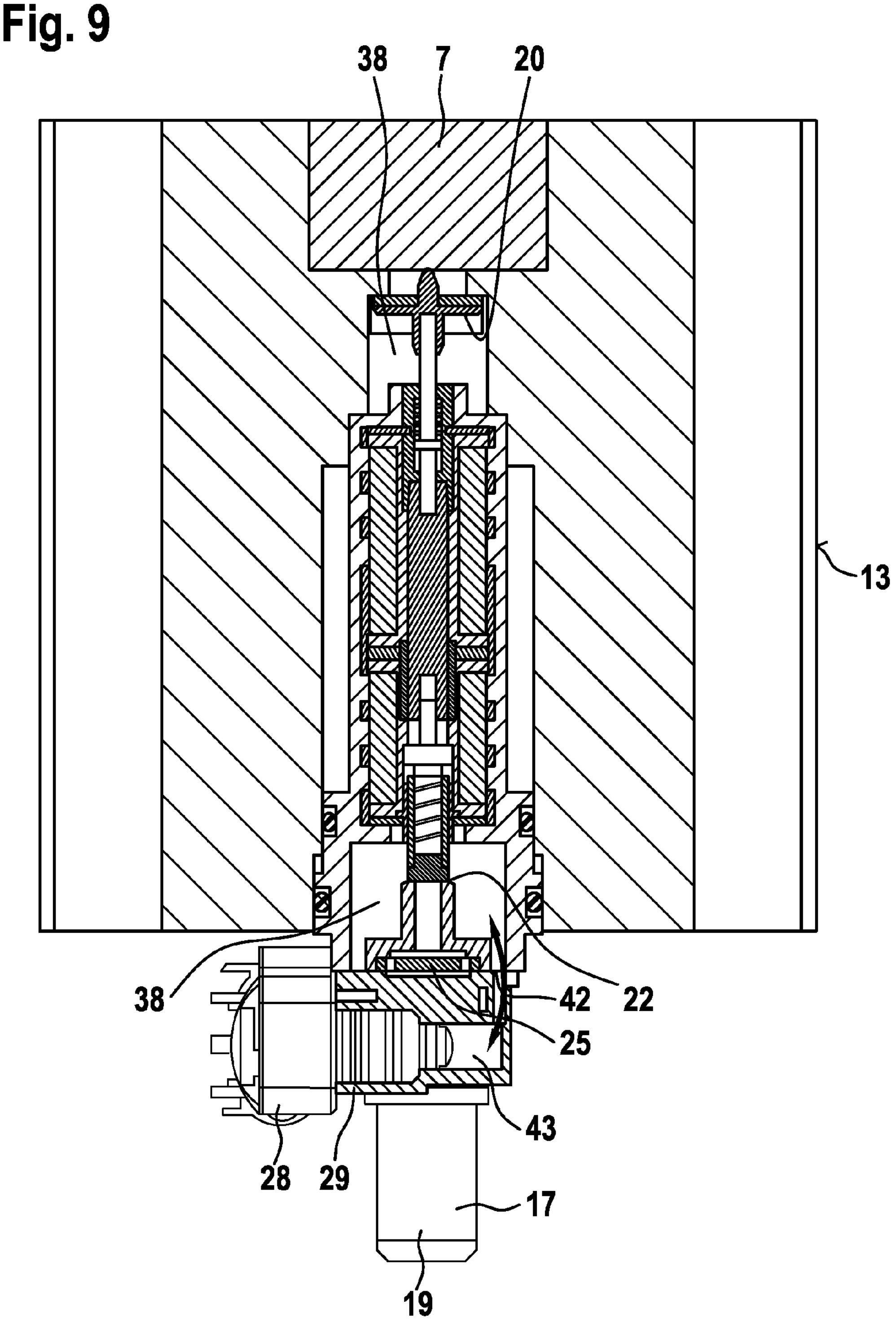
FIG. 9 shows a partial illustration of an active carbon filter unit with inserted control module in a sectional plane IX-IX of FIG. 8.

As can be seen with the aid of FIG. 9, the chamber 38 is, in addition, in continuous connection via an opening 42 with a further measurement chamber 43, which is intended for the detection of pressure and temperature of the gas atmosphere prevailing in the chamber 38 and is accordingly in operative connection with the sensors 4, 12.

Figure 8:
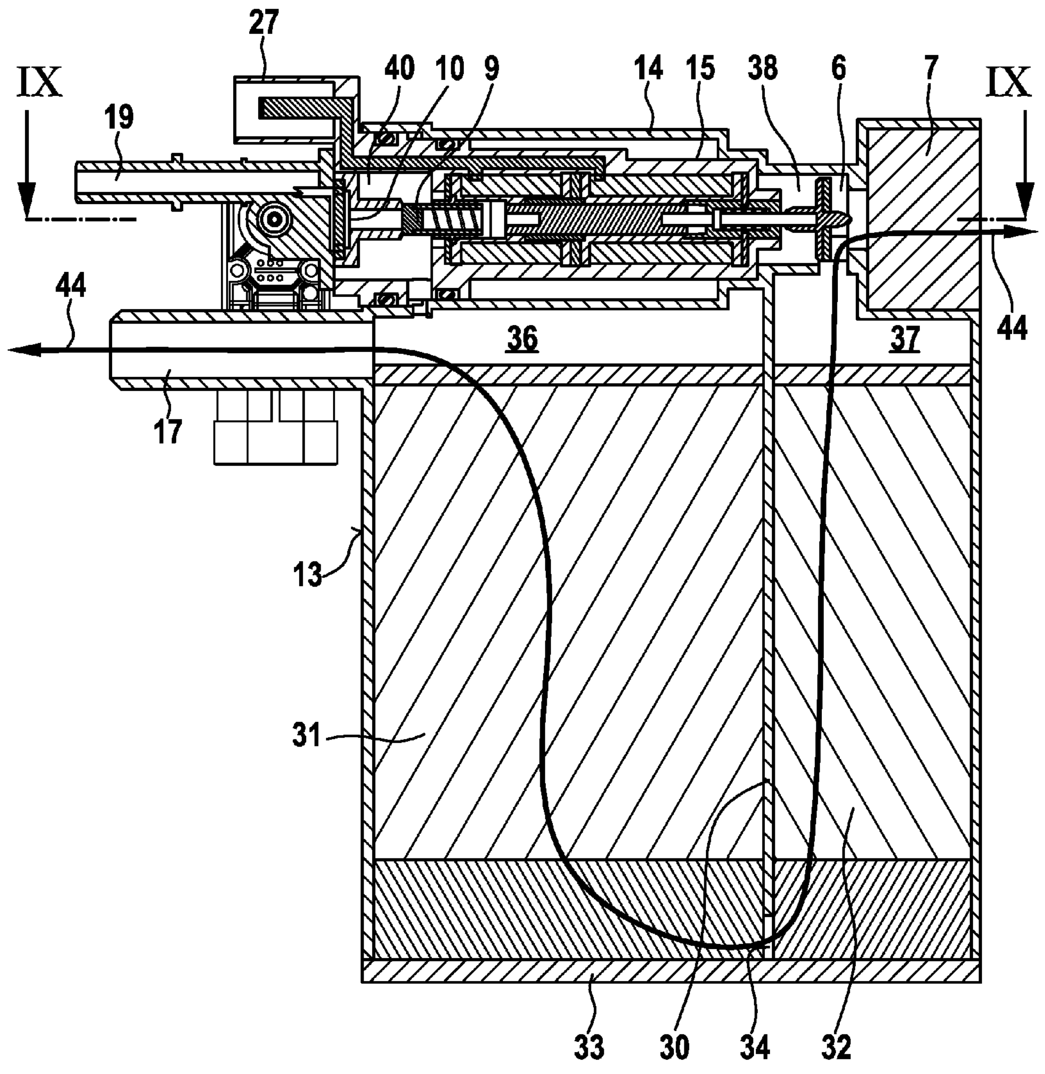
FIG. 8 shows an illustration of an active carbon filter unit with inserted control module during an air-removal phase in a vertical sectional plane.

FIG. 8 shows the operating state intended for the aeration and air removal of the tank system, wherein the valve 6 is opened and the valve 9 and the non-return valve 10 are closed. According to the directions of the arrow 44, a continuous connection exists, making possible a gas exchange, starting from the head space of the fuel container 1 or of a site of the tank system having the same effect, via the connection 17, the chambers 36, 31, 32, 37 and the air filter 7 with the ambient atmosphere. The flow path through the filter unit in this case being shown by the line indicated by reference number 44 which flows through the active carbon in the chambers 31, 32. Air laden with hydrocarbons from the head space can therefore flow out, according to the prevailing pressure and temperature conditions under adsorptive bonding of a hydrocarbon component in the chambers 31, 32 until reaching a pressure equilibrium with the environment. This is a state which exists for example when refueling the vehicle.

Figure 7:
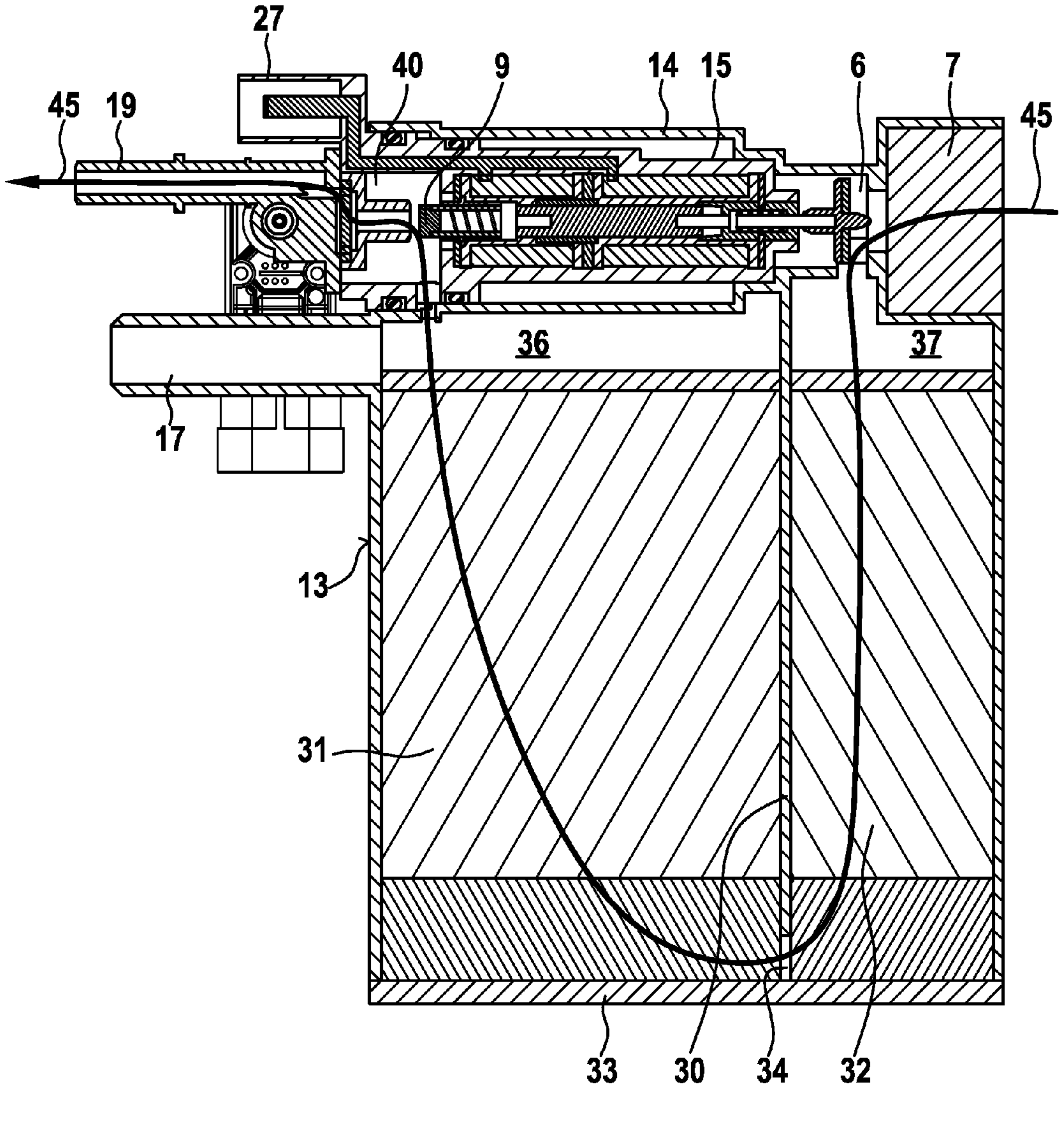
FIG. 7 shows an illustration of an active carbon filter unit with inserted control module during a flushing phase in a vertical sectional plane.

FIG. 7 shows the operating state intended for flushing the active carbon unit, where the engine is running, so that the non-return valve 10 and the valve 9 are in the open position, so that the chambers 40, 36, 31, 32 and 37 are acted upon with the underpressure (suction) of the suction pipe 11 of the engine via the connection 19. This underpressure draws in ambient air which flows through the chambers 31, 32, with a hydrocarbon content which is absorbed here being held and supplied via the connection 19 to the combustion chamber of the engine. The flow path in this case being shown by line 45. According to the prevailing pressure conditions, in this operating state likewise a drawing in is brought about via the connection 17 of air laden with hydrocarbons which, however, together with the air received via the air filter 7, is introduced into the combustion chamber. In each case, the active carbon component, held in the chambers 31, 32, undergoes a regeneration as a result of removal of the hydrocarbon component which was previously adsorptively bonded.

FIG. 6 shows the operating state intended for checking the tightness of the tank system, which is carried out automatically according to a presettable time interval with the cooperation of a superordinate control. For this purpose, with the engine running, firstly the valve 6 is transferred into the closed position which is shown, so that the tank system is acted upon with the underpressure of the suction pipe 11 via the connection 19 and a defined underpressure develops within the tank system. Then the valve 9 is also closed and subsequently by means of a measurement of the chronological pressure pattern by means of the sensor 12 a check is carried out as to whether if applicable a leakage exists which is not to be tolerated. The evaluation of the measurement result can be further improved by simultaneous measurement of the temperature of the gas atmosphere. Factually, the evaluation of the measurement result which is thus obtained is carried out in an automated manner by means of stored sets of comparative data also taking into account the temperature influence, with the result being able to be presented visually in a suitable manner.

LIST OF REFERENCE NUMBERS

1 Fuel container
2 Ventilation duct
3 Active carbon unit
4 Sensor
5 Air duct
6 Valve
7 Air filter
8 Air duct
9 Valve
10 Non-return valve
11 Suction pipe
12 Sensor
13 Housing
14 Mounting
15 Control module
16 Connection
17 Connection
18 Base body
19 Connection
20 Valve plate
21 Valve seat surface
22 Valve plate
23 Pipe element
24 Valve seat surface
25 Valve plate
26 Valve seat surface
27 Housing part
28 Housing part
29 Intermediate section
30 Intermediate wall
31 Chamber
32 Chamber
33 Base
34 Opening

35 Intermediate base
36 Chamber
37 Chamber
38 Chamber
39 Opening
40 Chamber
41 Opening
42 Opening
43 Measurement chamber
44 Arrow
45 Arrow

The invention claimed is:

1. An active carbon filter unit for a tank system comprising:

a housing having at least one chamber fillable with active carbon, said filter unit having a gas flow path through said chamber, which includes said active carbon, and which is capable of being brought in connection for fluid communication with the tank system, ambient atmosphere and a connection for producing an underpressure according to an execution of an operation for air removal, aeration or flushing or of a tightness check;

a first valve positioned in said flow path for opening and closing the connection of the flow path with the ambient atmosphere;

a second valve positioned in said flow path for opening and closing the fluid communication to the connection for producing said underpressure; and a control module in operative connection with the housing into which at least the first and second valves are incorporated, said control module comprising an elongated base body configured to be insertable into a recess of said housing to be connected therewith, said recess having first and second openings in fluid communication with said at least one chamber and which are in said flow path according to the operation being carried out, and said control module including electrical connections for said first and second valves.

2. The active carbon filter unit according to claim 1, wherein the control module is detachably connected with the housing.

3. The active carbon unit according claim 2, further comprising a non-return valve incorporated into the control module and in fluid communication with the connection for producing an underpressure.

4. The active carbon unit according to claim 2 further comprising a sensor for detecting the pressure of a gas atmosphere within the tank system incorporated into the control module.

5. The active carbon unit according to claim 1, further comprising a non-return valve incorporated into the control module and in fluid communication with the connection for producing an underpressure.

6. The active carbon unit according to claim 5, further comprising a sensor for detecting the pressure of a gas atmosphere within the tank system incorporated into the control module.

7. The active carbon unit according to claim 1, further comprising a sensor for detecting the pressure of a gas atmosphere within the tank system and which is incorporated into the control module.

8. The active carbon unit according to claim 1, further comprising a sensor for detecting the temperature of a gas atmosphere within the tank system and which is incorporated into the control module.

9. The active carbon unit according to claim 8, further comprising a sensor for detecting the pressure of the gas atmosphere within the tank system incorporated into the control module.

10. The active carbon unit according to claim 9, further comprising a measurement chamber arranged in the control module which is in operative connection at least with one of the pressure and temperature sensors and which is in continuous fluid communication with a first chamber formed within the control module directing the gas atmosphere of the tank system, constituting a section of the said flow path.

11. The active carbon unit according to claim 10, the wherein a second chamber formed inside the control module is in fluid communication with said at least one chamber and is positioned to be in fluid communication with the ambient atmosphere depending on the operation being carried out.

12. The active carbon unit according to claim 1, further comprising an air filter which is incorporated into the control module.

13. The active carbon unit according to claim 1, further comprising an air filter which is an integral component of the housing.

14. The active carbon unit according to claim 1, further comprising a sensor for detecting the pressure of a gas atmosphere within the tank system and a sensor for detecting the temperature of the gas atmosphere within the tank system, both of which sensors are incorporated into the control module, and further comprising electrical measurement, control and/or energy supply connections for the pressure and temperature sensors, wherein said connections are arranged in the housing.

15. The active carbon unit according to claim 1, further comprising connections for ducts intended to carry a gas, leading to the connection for producing an underpressure or to the tank system.

16. The active carbon unit according to claim 1, wherein said second valve comprises a valve plate and a valve seat surface, said first valve comprises a valve plate and a valve seat surface, and said valve plates of said first and said valves being moveable in an axial direction of said base body.

17. The active carbon unit according to claim 16, further comprising a non-return valve having a valve plate and a valve seat surface, said second valve and said non-return valve are arranged in fluid communication with and following one another in the direction of the connection for the underpressure.

18. The active carbon unit according to claim 17, wherein said control module further comprises a tube element, and wherein said valve seat surface of said second valve and said valve seat surface of said non-return valve are arranged on opposite sides of said tube element, and the valve seat surface of said first valve is arranged to be in fluid communication with an air filter.

* * * * *